June 19, 1934.   C. H. GEISTER   1,963,128
MEASURING APPARATUS
Filed Feb. 1, 1932   3 Sheets-Sheet 1
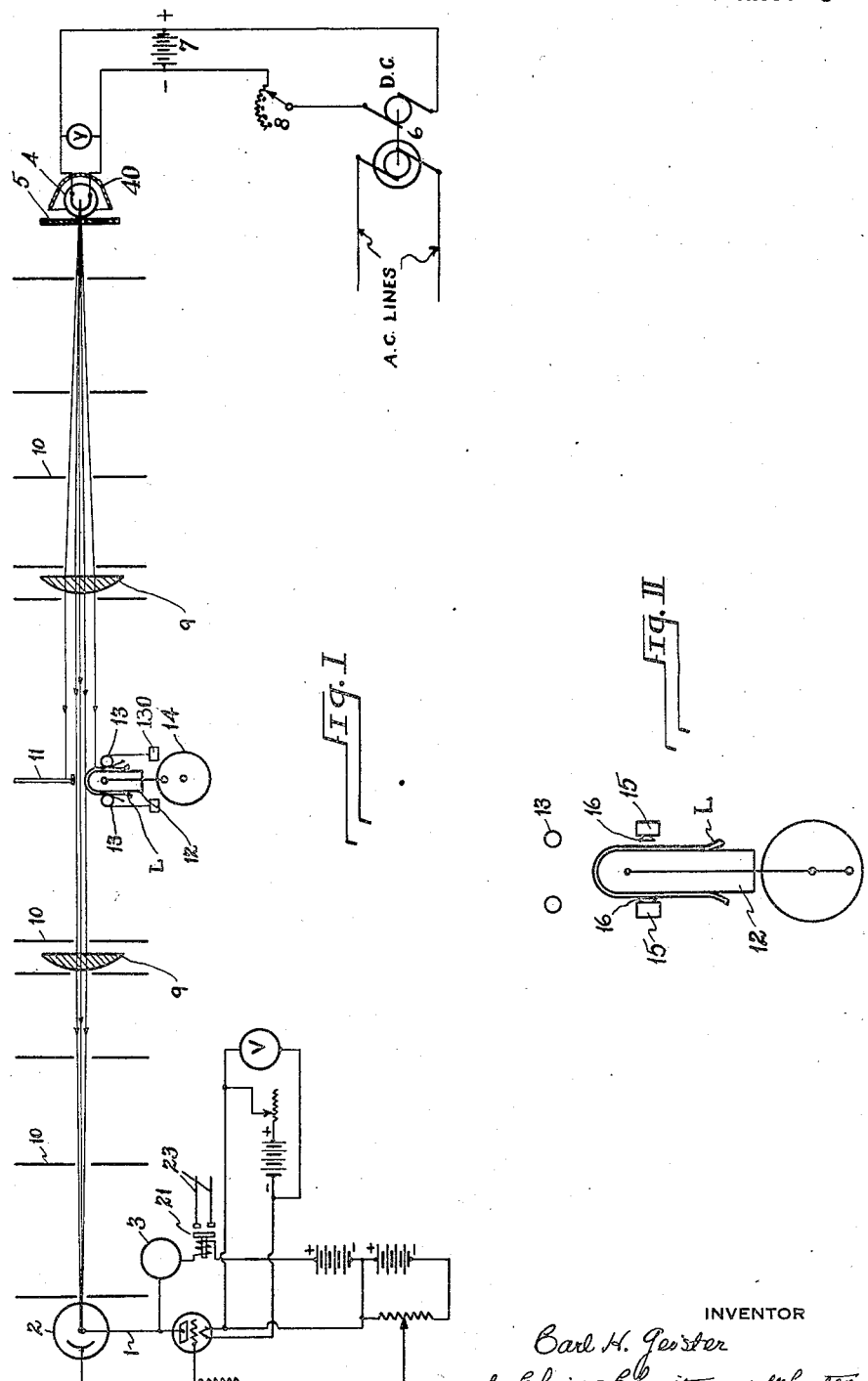
INVENTOR
Carl H. Geister
by Christy Christy and Wharton
his attorneys

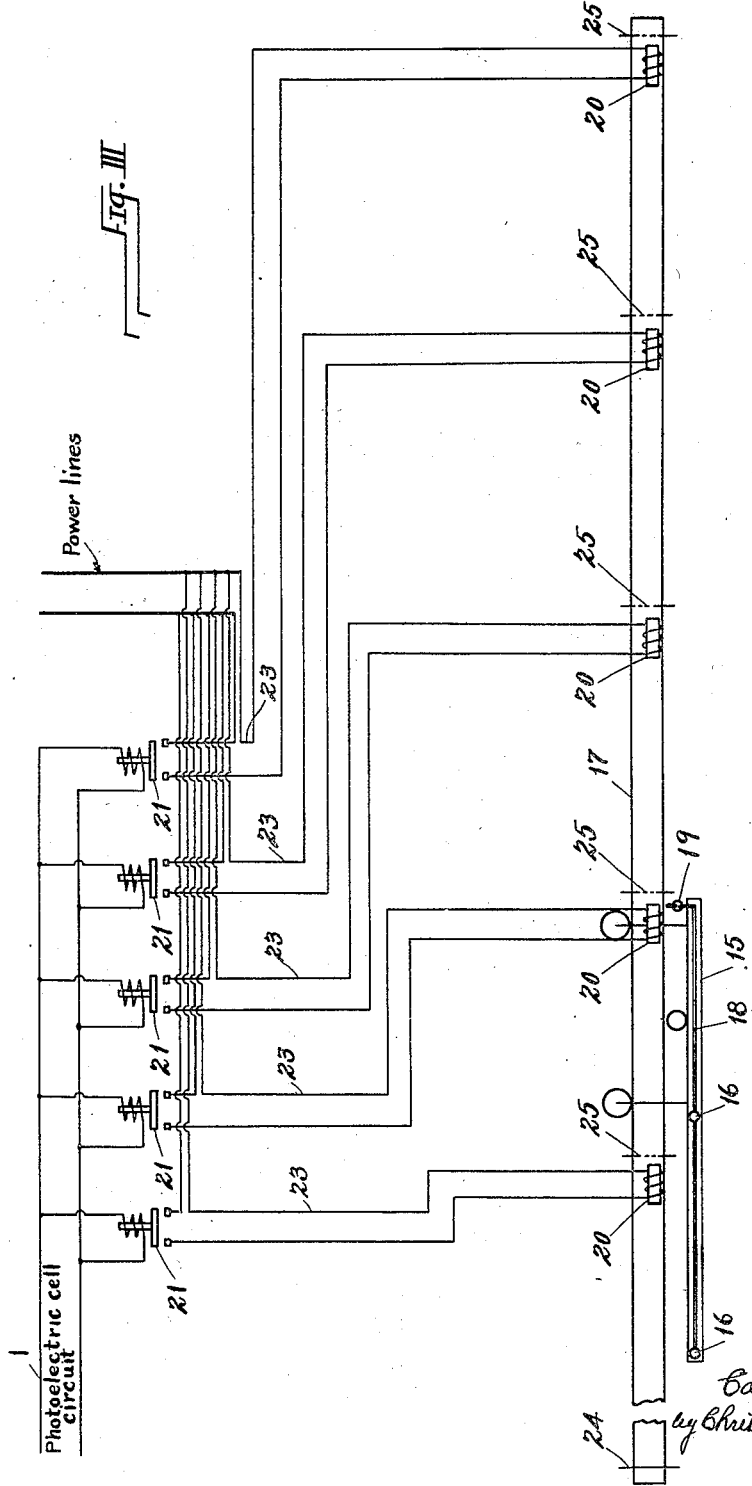

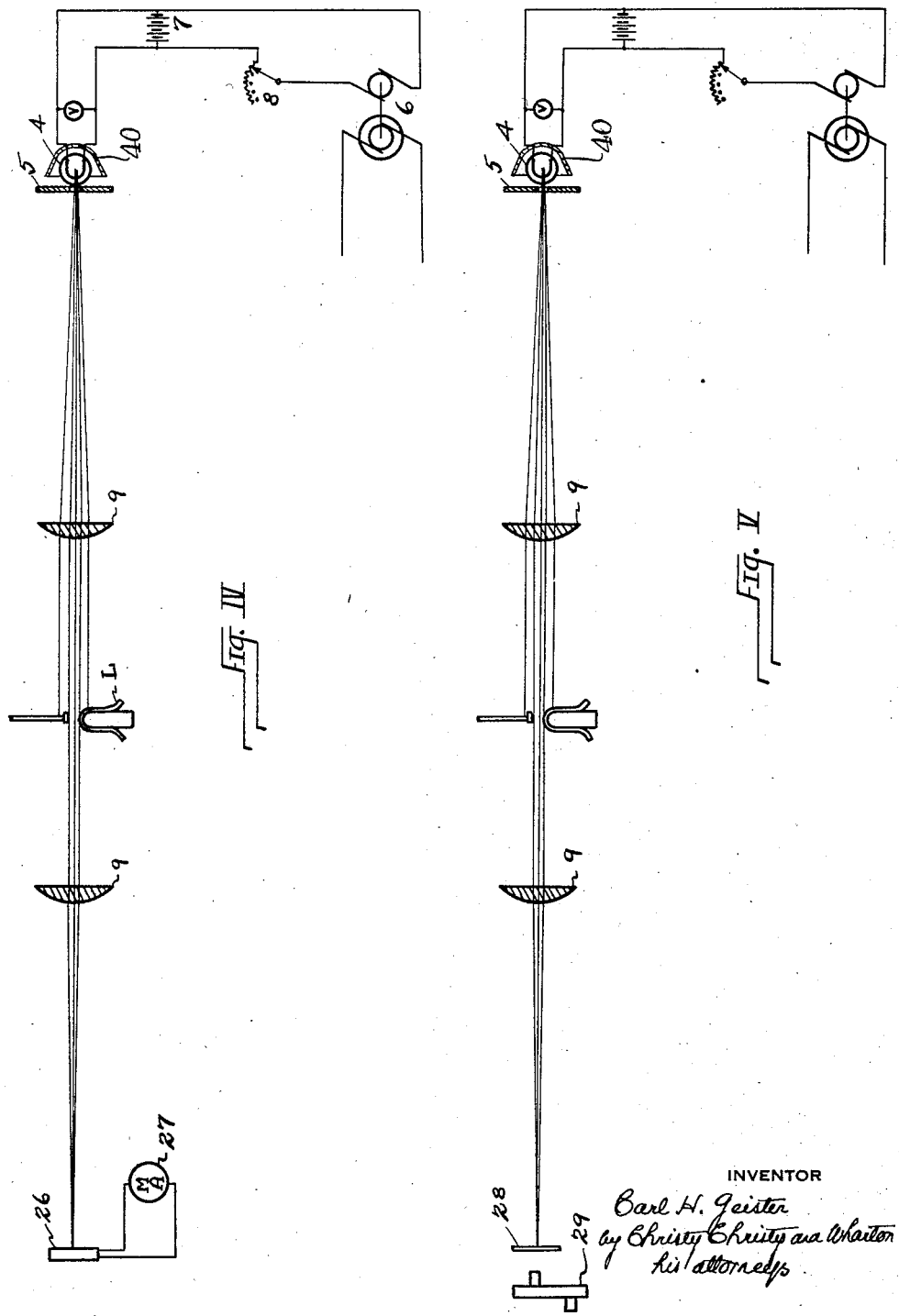

Patented June 19, 1934

1,963,128

UNITED STATES PATENT OFFICE 1,963,128

MEASURING APPARATUS

Carl H. Geister, Pittsburgh, Pa., assignor to Percival E. Foerderer, Philadelphia, Pa.

Application February 1, 1932, Serial No. 590,102

6 Claims. (Cl. 209—111)

This invention relates to improvements in apparatus for measuring sheet material and for sorting by measurement a plurality of articles of sheet material which vary in dimension; the objects in view are accuracy and speed. The invention finds practical application in the measurement and sorting of skins of leather, and in that application I shall, in an exemplary way, describe it.

In the accompanying drawings Fig. I is a diagrammatic view of apparatus of the invention, including an instrument for affording visible indication of the measurement desired; Fig. II is a fragmentary view of a portion of the apparatus shown in Fig. I, having associated with it sorting instrumentalities which, for the sake of clearness, have been omitted from Fig. I; Fig. III is a diagrammatic view of the sorting apparatus, and in it parts shown in Fig. II in end elevation are shown in side elevation; Figs. IV and V are views otherwise corresponding to Fig. I and showing alternative means for determining quantity of light.

The usual practice of "hefting," that is to say, classifying by their weight, light leathers is to fold the skin across the line of the backbone, and to draw the folded skin between the fingers. An estimate of the average thickness across the medial portion of the skin may thus be made. The accuracy of grading in such manner depends upon the niceness of the operator's sense of touch and upon his skill acquired in long continued practice. Even so, accuracy varies from man to man, slight variations escape detection, and the accuracy of the individual may at times be impaired by fatigue or from other cause.

The actual weighing of leather gravitationally, and classifying of it accordingly, is not satisfactory; for leather is absorbent of water, and its weight gravitationally varies with its condition of wetness or dryness; different dressings give to the dressed leather a gravitational factor of uncertain and indeterminable value; furthermore, in this system of classifying, the edges and margins of the skins are included in the measurement, as well as the medial portions, and these parts are variable with respect to the medial parts, both in extent and in thickness; and it is the medial part of a skin which is of chief value. It is the average thickness across a certain area of its medial portion which is the proper index of the industrial desirability of a skin. By this invention the average thickness of the skin may be determined on a suitable section of limited extent across the medial portion of the skin; the desirability of the skin for industrial purposes may thus be accurately determined; and successive skins subjected to the action of the apparatus may thus be sorted.

According to the present invention, the skin to be measured and sorted is, in a proper portion of its extent, spread taut upon a support, to form one boundary of the pathway of a beam of light; the pathway is, accordingly, at that point narrowed to greater or less degree, according to the thickness of the skin, and the beam of light projected along the pathway is, by the skin-faced support, cut away in part, so that a portion only of the projected beam reaches a certain light-responsive device which lies in the pathway of the beam, at a point beyond the support on which the skin is carried. The quantity of light received by the light-responsive device alluded to will, consequently, be great or less, according as the skin is thin or thick. The beam of light is, at the point in question, of substantial width (say eighteen inches), and the skin extends upon the support for a distance corresponding to the width of the beam; consequently, the quantity of light passed and received by the responsive device is an accurate index of the average thickness of the skin throughout that portion only about which it is important to have the data. The determination is unaffected by the varying thickness of the skin elsewhere in its extent.

Referring to Fig. I of the drawings, a light-sensitive device is provided, which in this particular instance is a photo-electric cell, indicated at 2, included in a circuit 1. It is characteristic of a photo-electric cell that its resistance to flow of current in the circuit in which it is set varies, according to the quantity of light cast upon it; the greater the illumination, the less the resistance. The cell as ordinarily constructed consists of a glass tube, either evacuated with substantial completeness, or containing an atmosphere (of proper gas) at very low pressure. Within the tube a cathode and an anode are sealed (with which parts, in the installation, the branches of the circuit are connected). The cathode is, typically, a plate coated with a material sensitive to light, and has the property of emitting electrons when exposed to light of proper wave-length, and of emitting them in quantities proportionate to the quantity of light which it receives. The electrons stream from cathode to anode, and the current which flows in the circuit in which the cell is included varies with the magnitude of the electron stream.

Means for generating light of proper wave-length and of uniform intensity are indicated on the right, Fig. I. They include (using the figures of an actual installation) a ten-volt, seven-and-one-half-ampere, photophone exciter lamp 4. This lamp may be and, in the installation which I am describing, is provided with a suitable reflector 40, preferably parabolic. In front of the lamp is set a mask 5 in which is formed, on the axis of the reflector, an orifice an eighth of an inch wide and a quarter of an inch long. Across the orifice extends a sheet of photographic ground glass. The lamp is energized by a motor-generator set 6. A ten-volt storage battery 7 is arranged in the circuit, in shunt with the lamp 4, whose purpose is to prevent the disturbance which sudden changes in voltage otherwise would cause. A rheostat 8 affords compensation for inequalities in degree to which the battery is charged. The maintenance of constant voltage is a matter well understood in electrical engineering.

The lamp 4 is arranged, as the drawings show, to project its beam through the orifice in mask 5, upon the cathode in the cell 2. In the path of the beam of light proper instrumentalities, exemplified in lenses 9, 9 may be set, properly to control the dispersion of the rays and to bring them ultimately to impinge upon the cathode of the cell 2; and, adjacent the path, screens 10, 10 and 11 may be arranged, which screens, while permitting the passage of the beam, will cut off and absorb aberrant rays.

I have said that, in the installation which I have described, a reflector and lenses are provided to project and concentrate the beam of light. It will be understood that, by reflectors arranged behind both light source 4 and photo-electric cell 2, and without the aid of such lenses as those shown, a beam of parallel rays of light may be projected and defined, to serve the ends described.

At a point intermediate the lamp 4 and the cell 2 and adjacent to the path of the beam of light a support 12 is arranged and the position of the support 12 is so minutely determined that a skin of leather (or other material to be classified) L, spread upon the support, will partially obstruct the pathway and cut off part of the beam of light, and the part so cut off will be greater or less, according to the average thickness of the skin throughout the area defined by the support. I repeat that at this point the width of the beam of light, and the corresponding effective length of the support 12, may be of the order of 18 inches.

Particular means for drawing a skin of leather taut upon the support 12 are indicated. The support is shown in the form of a bar which is reciprocable vertically between rollers 13. Reciprocation of the bar is effected by rotation of a crank disk 14, to which the bar is linked. Free turning of rollers 13 may be restrained by weights or brake-bands. Weighted brake-bands are indicated at 130. The proportions may be such that, as the skin-covered bar is driven upward, the skin is by the agency of the rollers spread smooth and drawn taut. The bar 12 in its advanced position, at the height of its rise as seen in Fig. I, is accurately located, relatively to the path of the beam of light; and, such being the case, the skin will cut off more or less light, as its average thickness across the area measured is greater or less. The quantity of light then, received by the sensitive element of the photo-electric cell 2, will be greater or less, as the measured area of the particular skin is thinner or thicker.

A suitable measuring instrument is provided in association with the light-sensitive device, for indicating the quantity of light received; and, in specific association with the photo-electric cell 2 a potentiometer 3 is provided, and included in the circuit 1. This instrument affords indication of the strength of current flowing through the cell; and the reading of the instrument, accordingly, becomes an index of the average thickness of the skin under test throughout the area of test. The instrument, thus acting, may serve as a classifying instrumentality. The attendant, noting the reading and making record thereof, may, additionally, make disposal of the particular skin according to such notation.

Fig. II shows, in association with the vertically reciprocating support 12, certain conveying apparatus; and this conveying apparatus is further illustrated in Fig. III. A carriage is provided which includes two bars, 15, and the carriage is adapted to advance and recede in the direction of the length of the bars to and from the position, indicated in Fig. II, in which the bars extend on opposite sides of and facing the skin-covered support 12, the support being in its retracted and lowered position. The bars 15 carry suction cups 16, suitable in number and suitably disposed. When the bars are advanced (in right-to-left direction, Fig. III) to co-operative position relatively to the lowered support 12 with the skin L (free of the tension rollers 13) resting loosely upon it, the suction cups stand with their rims adjacent the surface of the leather and at so slight an interval from the face that the cups (when suction is applied) are effective to draw to themselves and hold by suction the free skirts of skin. A pneumatic line 18, for alternately applying and relieving suction in cups 16, extends upon the carriage, and in the line is included a valve-controlled vent 19. As the carriage advances to the described position of co-operation with support 12, a fixed trip 24 may be made effective both to stop the carriage and to shift the valve and close the vent 19. In any case it is effective to close the vent. Thereupon suction becomes effective to secure the skin to the carriage.

The carriage, comprising the bars 15, travels as a unit upon a suitable track or runway, 17; and along this runway the carriage may be shifted, manually or by suitable mechanical power.

Along the runway 17 trips 25 are set in spaced succession, to effect suitable distribution of the differentiated skins. These trips 25 severally are movable between inactive and active positions, and electromagnets 20 are provided, and associated, one with each trip. When an electromagnet 20 is energized the associated trip 25 is shifted from inactive to active position. The electromagnets 20 are differentially energized, according to the intensity of current which is caused to flow in circuit 1—that is to say, according to the thickness of the skin which is being subjected to the sorting operation. In circuit 1 relays 21 are included (one only is diagrammatically shown in Fig. I), one for each electromagnet 20, and they are in known manner so severally constructed as to function one by one, each in response to a current of distinct value flowing in circuit 1. Such selective operation may, for instance, be gained by causing the relay 21 associated with that electromagnet 20 which stands nearest the support 12 (the one farthest to the left, Fig. III) to be responsive only to current of greatest intensity, and by causing the succeeding relays from left to right to be responsive to current of successively less degree of intensity; or the several relays may each, by known features of structure, be made responsive to current within certain limits of range, and the limits for the several relays may be mutually exclusive.

Each relay includes a relay circuit 23, and in the relay circuits 23 the electromagnets 20 are severally included. As the carriage bearing a skin moves from left to right (Fig. III), carrying a skin, passing inactive trips (if any), it comes to engagement with that trip which has been shifted to active position. By such engagement the carriage may be stopped, the driving means (if such be provided) may be reversed, and, whether either of the two results just mentioned be brought about or not, certainly such engagement will effect the opening of vent 19. Suction will thereupon be relieved, and the skin will fall. The trip which has so been effective will be recognized to be that trip which in the organization has been set selectively by the very skin which now it releases. When a trip has served its described purpose, it may be returned, manually or automatically, to its normal inactive position.

A tabulation of exemplary amperages follows, and the five relays 21, from left to right, Fig. III, may be built to be responsive severally to such amperages, with the result that at the five stations indicated by the positions of the five electromagnets 20 the skins will be dropped, sorted in the manner described in five particular classes.

| Effects release of | Milliamperes |
| --- | --- |
| Heavy skins | 2.0 to 7.5 |
| Plump medium skins | 7.6 to 10.5 |
| Medium skins | 10.6 to 13.5 |
| Light medium skins | 13.6 to 16.5 |
| Light skins | 16.6 to 20.0 |

In operation, the skins, one by one, are laid on support 12 when the support is in lowered position. The support is raised and the skin, drawn smooth and taut upon it, becomes a boundary of the pathway of the beam of light which streams from the source 4 and impinges on the light-sensitive element in the photo-electric cell 2. According as the skin is heavy or light the magnitude of the beam of light is small or great, and, accordingly, the current which flows in circuit 1 is small or great. The instrument 3 indicates the grade of the particular skin. At the same time, one or another of the relays 21 is caused to operate, and one or another of the movable trips 25 is shifted to active position. Support 12 descends, and as it descends the skin which it bears is freed of restraint and lies loose upon it. At the same time carriage 15 advances and the suction cups come to position adjacent the skirts of the sheet. Engagement with trip 24 closes vent 19, suction is exerted, the skin is caught and held. The carriage then is caused to move the reverse direction, away from the support 12, carrying the skin with it. The carriage continues so to move, until, by engagement with the particular trip which had been shifted, suction is relieved, and the skin falls. As a succession of skins is so dealt with, not only are they severally "hefted," by the reading of the instrument 3, but they are distributed by being dropped at different points in the range of carriage travel, according to their weight.

It is particularly to be remarked that the photo-electric cell is responsive to the average thickness of the skin throughout a selected and predetermined critical region—not to the thickness at one point, nor to the maximum thickness within a particular range.

In Figs. IV and V I indicate means other than a photo-electric cell and a potentiometer, for obtaining indication of the quantity of light which passes, not eclipsed by the body of leather. In Fig. IV an element 26 is indicated. This is an element sensitive to light, included in a circuit; and the characteristic of the light-sensitive element is that when exposed to light a current flows in the circuit, and the strength of the current is great or less, according to the quantity of light which impinges on the element. Included in the circuit is a microammeter 27 also, whose reading will be indicative of the extent to which the beam of light is eclipsed by the body of leather and, therefore, indicative of the "heft" of the specimen of leather under test. A light-sensitive element having the characteristics indicated is exemplified in an article on the market and known as the Weston photronic cell.

In Fig. V I indicate at 28 a screen of ground glass upon which the beam of light, after passing the edge of the skin of leather under test, impinges. In association with the screen a photometer 29 is employed. The quantity of light impinging on screen 28 may be measured by the photometer, and, according to such measurement, the successive skins subjected to test may severally be dealt with.

I claim as my invention:

1. In apparatus for determining the average thickness of flexible sheet material a single light-sensitive device, means for directing a beam of light to impingement upon the light-sensitive device, means to sustain a sheet of material in a bend which extends in a direction transverse to the beam of light and adapted to cut off more or less light along an extended width of the beam on its way to the light-sensitive device, according to the thickness of the sheet, and means for measuring the quantity of light received by the light-sensitive device.

2. In apparatus for determining the average thickness of flexible sheet material a single photo-electric cell, means for directing a beam of light to impingement upon the photo-electric cell, means to sustain a sheet of material in a bend which extends in a direction transverse to the beam of light and adapted to cut off more or less light along an extended width of the beam on its way to the photo-electric cell, according to the thickness of the sheet, a circuit in which said photo-electric cell is included, and means operated by current flowing in such circuit for indicating difference in current strength.

3. In apparatus for determining the thickness of flexible sheet material a photo-electric cell, means for directing a beam of light to impingement upon the photo-electric cell, an elongate support adapted to sustain a sheet of material when flexed in transverse bend upon it, such support extending in a direction transverse to the beam of light and adapted to define the pathway of the beam on its way to the photo-electric cell, cutting off more or less light according to the thickness of the sheet, the said support being movable to and from such position of light definition, means co-operating with the support for drawing a sheet of material smooth and taut upon it as the support moves to such position of light definition, a circuit in which said photo-electric cell is included, and means operated by current flowing in such circuit for indicating differences in current strength.

4. In apparatus for determining the thickness of flexible sheet material a photo-electric cell, means for directing a beam of light to impingement upon the photo-electric cell, means to sustain a sheet of flexible material in a bend which extends in a direction transverse to the beam and to cut off more or less of the light according as the material is thick or thin, a carriage movable with respect to said sheet-sustaining means and adapted to receive from such sheet-sustaining means a sheet of material, said carriage being equipped with means for alternately engaging and releasing the sheet, a plurality of trips arranged along the course of carriage travel and severally movable from inactive position to a position of engagement with the carriage-borne sheet engaging and releasing means, and means subject to the control of the photo-electric cell for shifting the said trips selectively from inactive to active positions.

5. In apparatus for determining the thickness of flexible sheet material, a light-receiving device, means for directing a beam of light to impingement upon the light-receiving device, a support movable athwart the directed beam of light to and from an operative position adjacent the beam and, when sustaining a sheet of the material to be measured, obstructing in greater or less degree the beam, according to the thickness of such sheet material, means for drawing a sheet of material taut upon such support when the support is advanced to operative position, and means for measuring the quantity of light received by the light-receiving device when the said support is in advanced position with the sheet material drawn taut upon it.

6. In apparatus for determining the thickness of flexible sheet material, a light-receiving device, means for directing a beam of light to impingement upon the light-receiving device, a support movable athwart the beam to and from an operative position adjacent the beam, and a position, when the support is faced with flexible material, of more or less complete cutting off of the beam, a carriage movable longitudinally of the support and equipped with suction cups, the parts being so relatively situated that when the support is in inoperative position and the carriage advanced the carriage-borne suction cups stand in operative relation to a sheet of flexible material borne by the said support.

CARL H. GEISTER.